United States Patent [19]
McNealy et al.

[11] Patent Number: 5,876,070
[45] Date of Patent: Mar. 2, 1999

[54] PIPE FLANGE CONNECTION FOR PRESSURE RETAINING, ABRASIVE/CORROSIVE SERVICE

[75] Inventors: Richard McNealy, Salt Lake City; Doug Stauffer, Sandy, both of Utah

[73] Assignee: Kennecott Holdings Corporation, Salt Lake City, Utah

[21] Appl. No.: 763,358

[22] Filed: Dec. 11, 1996

[51] Int. Cl.$^6$ ............................... F16L 9/14; F16L 23/00
[52] U.S. Cl. ........................... 285/55; 285/350; 285/363; 285/368
[58] Field of Search .................... 285/363, 368, 285/350, 55

[56] References Cited

U.S. PATENT DOCUMENTS

| | | | |
|---|---|---|---|
| 3,727,926 | 4/1973 | Berry | 285/350 |
| 3,771,817 | 11/1973 | Schabel | 285/55 |
| 4,113,407 | 9/1978 | Grzina | 285/350 |
| 4,494,776 | 1/1985 | Press | 285/55 |
| 4,653,724 | 3/1987 | Garrigues | 285/350 |

OTHER PUBLICATIONS

Garlock Metallic Gasket Inc., Flexseal® Catalog & Design Manual, pp. 4–39, Advertising Literature—publication date unknown but earlier than effective U.S. filing date.

*Primary Examiner*—Eric K. Nicholson
*Attorney, Agent, or Firm*—Whyte Hirschboeck Dudek SC

[57] ABSTRACT

The present invention involves a pipe flange internally fitted with a lining. The pipe flange has a face with an annular groove extending outward from the inside surface along at least a portion of the face. The groove may be tapered becoming deeper as it travels outward from the inside surface. The lining extrudes into the annular groove partially filling the groove and protruding beyond the face of the flange. The unfilled portion of the annular groove forms an expansion cavity into which the lining can extend when the lining is mated to another object using compressive force. The present invention also provides a pipe flange connection where the face of the internally lined pipe flange is mated to another object using compressive force. The present invention also provides a method of applying an elastomeric lining inside a pipe flange. The method involves affixing a mold to the face of a flange having an annular groove. The mold having an inner plate which ensures creation of an expansion cavity within the annular groove and an outer plate which ensures consistent protrusion of the lining beyond the face of the flange. After the lining has cured and a gasket template and grinding template are attached to the face of the flange simulating the affects of mating an object to the flange using a compressive force. The lining is ground against the grinding template removing any inwardly bulging deformations caused by the assembly of the pipe flange connection.

4 Claims, 4 Drawing Sheets es,876,070

PIPE FLANGE CONNECTION FOR PRESSURE RETAINING, ABRASIVE/CORROSIVE SERVICE

BACKGROUND OF THE INVENTION

This present invention relates to the design and method of production associated with a pipe flange connection for the pressurized transport of abrasive and/or corrosive materials. The pipe flange connection has an interior lining which does not bulge inwardly when the pipe flange is mated to another object using compressive force and provides for high pressure sealing capability with complete isolation of a mechanical joint from abrasive and/or corrosive materials.

The use of piping lined internally with abrasion resistant and/or chemically resistant materials, e.g. elastomers and plastics, to facilitate the transport of abrasive and/or corrosive materials in the form of a liquid, liquid/solid slurry mixture, or as a dry powder is well known. When piping is assembled in various configurations, pipe flanges having an inside lining are designed and constructed in accordance with established national standards. The existing pipe flange connections contain design flaws which limit their application in pressurized applications and limit the life expectancy of lined piping systems. Specifically, known designs are limited in terms of pressure rating and the maintenance of pressure tightness over the service life of the pipe flange connection.

The pressure seal in prior art pipe flange connections was accomplished by extending an internal lining across the faces of the flange. This extension of the internal lining provided a pressure sealing gasket surface as well as a mechanically fixing the lining to the ends of the pipe. In addition, the remainder of the pipe flange was isolated from corrosive and/or abrasive attack. As shown in FIG. 1, compressing the lining in this manner resulted in compression and extrusion of the lining so that a visible inward bulging of lining material occurred at the parting line of the joint located between the objects being mated together. This inward bulge causes and/or contributes to flow turbulence Q at the joint interface. Turbulence of this type increases the rate of wear and corrosion of protective liners.

Known pipe flange connections are also limited in the internal pressure that can be contained by such connections. This limitation is due to the inherent low strength of the lining which serves as the gasket for the joint. Linings have a tendency to creep or continue to deform under the constant stress imposed when opposing flange faces are compressed together. Gasket creep will cause gaskets to loose their sealing ability with time compromising the pressure integrity of the joint. Compression limiting stops are often used within pipe flange connections to mitigate the affects of gasket creep but do nothing to improve the basic pressure retention capability of the lining when used as a gasket.

While conventional pipe flanges are generally effective for supplying fluid, for the foregoing reasons, a need exists for a pipe flange connection for the pressurized transport of abrasive and/or corrosive materials.

BRIEF SUMMARY OF THE INVENTION

According to this invention, a pipe flange, a pipe flange connection, and a method making of an internally lined pipe flange are provided for the pressurized transport of abrasive and/or corrosive materials. The design and method of production results in the joint of a pipe flange connection having a physical profile that minimizes turbulent flow.

The pipe flange is fitted internally with an elastomeric lining and has a face with an annular groove extending outwardly from the inside surface along at least a portion of the face. The lining extends from the inside surface into the groove such that the lining at least partially fills the groove. In addition, the lining protrudes beyond the face of the flange. The portion of the groove not filled with the lining forms an expansion cavity into which the lining can extend when the lining is compressed.

The annular groove may be tapered such that the groove becomes deeper as it progresses outwardly from the inside surface of the pipe flange.

The face of the pipe flange may have at least one opening for receiving a fastener allowing the flange to be mated to another object using compressive force.

The pipe flange connection of the present invention comprises a pipe flange internally fitted with a lining, and another object mated against the face of the pipe flange using compressive force. The object mated with the pipe flange may be a tank or another pipe flange. The pipe flange is sized so that when mated with another object, the physical profile of the joint created does not contain an inward bulge when the lining is compressed during assembly.

The pipe flange connection may also include a fastener extending through the face of the pipe flange in order to mate the pipe flange with another object using compressive force.

The pipe flange connection may further comprise a gasket extending circumferentially about the pipe flange located outside the annular groove. The gasket is compressed between the face of the flange and the object mated to it.

The present invention also involves a method of applying an elastomeric lining to the inside of a pipe flange. The method involves providing a pipe flange having a face with an annular groove extending outwardly from the inside surface of the pipe flange along at least a portion of the face. A mold is affixed to the face of the pipe flange. The mold has an inner plate and an outer plate. The inner plate of the mold ensures that an expansion cavity is created during molding within the annular groove between the lining and the face of the pipe flange. The outer plate of the mold provides for a consistent protrusion of the lining beyond the face of the flange during molding.

This method may also include removing the mold after the lining has cured and affixing a gasket template and a grinding template to the face of the pipe flange. The gasket template and the grinding template simulate the affects of mating an object to the pipe flange using a compressive force. Finally, the compressed lining is ground against the grinding template to remove any inwardly bulging deformations. The grinding leaves the physical profile of the joint between the pipe flange and an object (i.e., an identical pipe flange) mated to the pipe flange void of any inwardly bulging deformations in the lining. These deformations can cause turbulent flow during the pressurized transport of abrasive and/or corrosive materials.

These and other features, aspects and advantages of the present invention will become better understood when read in conjunction with the following description, claims, and accompanying drawings.

DETAILED DESCRIPTION OF THE INVENTION

Like numerals are employed to designate like parts throughout the drawings. Various items of equipment such as fasteners, fittings, etc., are omitted so as to simplify the description. However, those skilled in the art will realize that such conventional equipment can be employed as desired.

Figure 1:
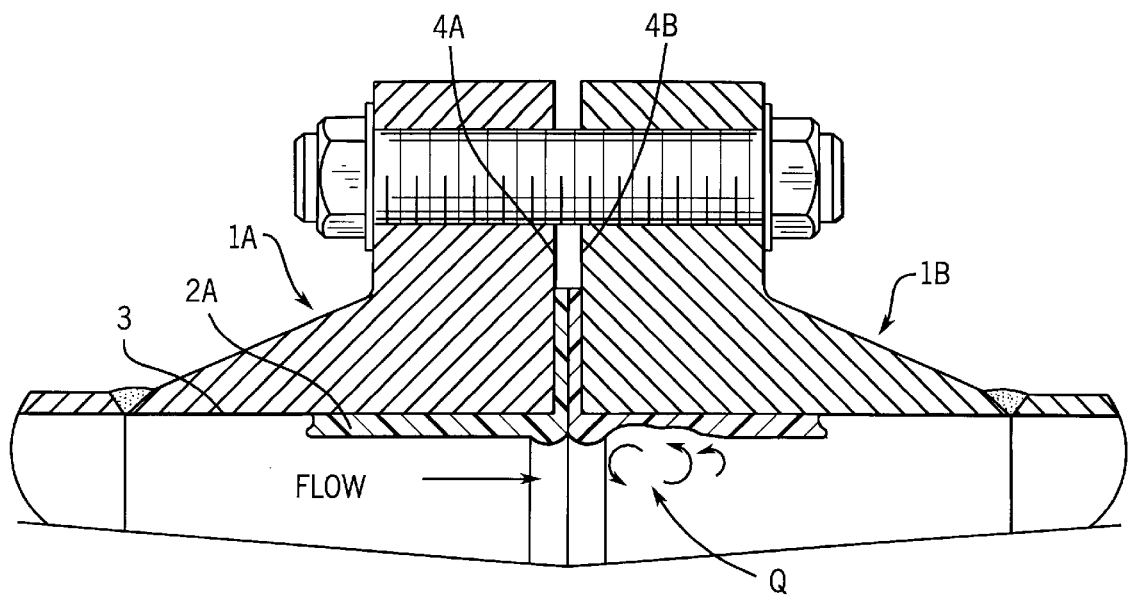
FIG. 1 is a section view of an existing pipe flange mated to an identical pipe flange using compressive force illustrating the zone of turbulent flow Q.
Figure 2:
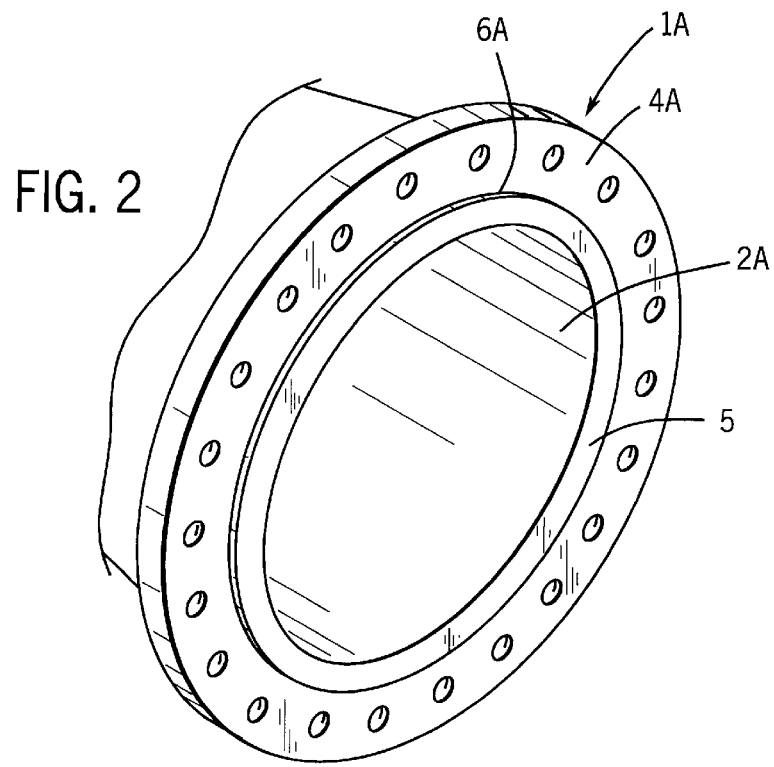
FIG. 2 is a perspective view of a pipe flange of the present invention fitted with an elastomeric lining.
Figure 3:
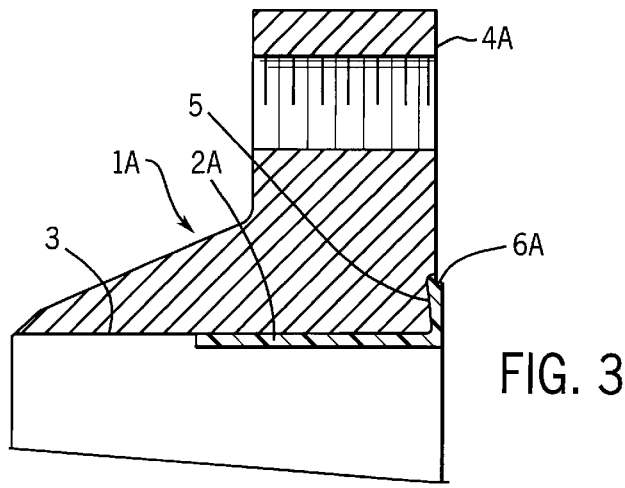
FIG. 3 is a section view of a pipe flange of the present invention fitted with an elastomeric lining.

As shown in FIGS. 2 and 3, pipe flange 1A is fitted internally with lining 2A along inside surface 3. Pipe flange 1A has face 4A having an annular groove 5 which extends outward from inside surface 3 along at least some portion of face 4A. Lining 2A extends into groove 5 such that lining 2A at least partially fills groove 5. In addition, lining 2A protrudes beyond face 4A of flange 1A. The unfilled portion of groove 5 forms an expansion cavity 6A into which lining 2A can extend when lining 2A is compressed.

Lining 2A is made of any elastomeric or deformable material, e.g. synthetic rubbers, which provides protection to pipe flange 1A during the pressurized transport of abrasive and/or corrosive materials.

The present invention also involves a pipe flange connection where the face of a pipe flange is mated to another object, e.g., a tank, similar pipe flange or like device using compressive force.

Figure 4:
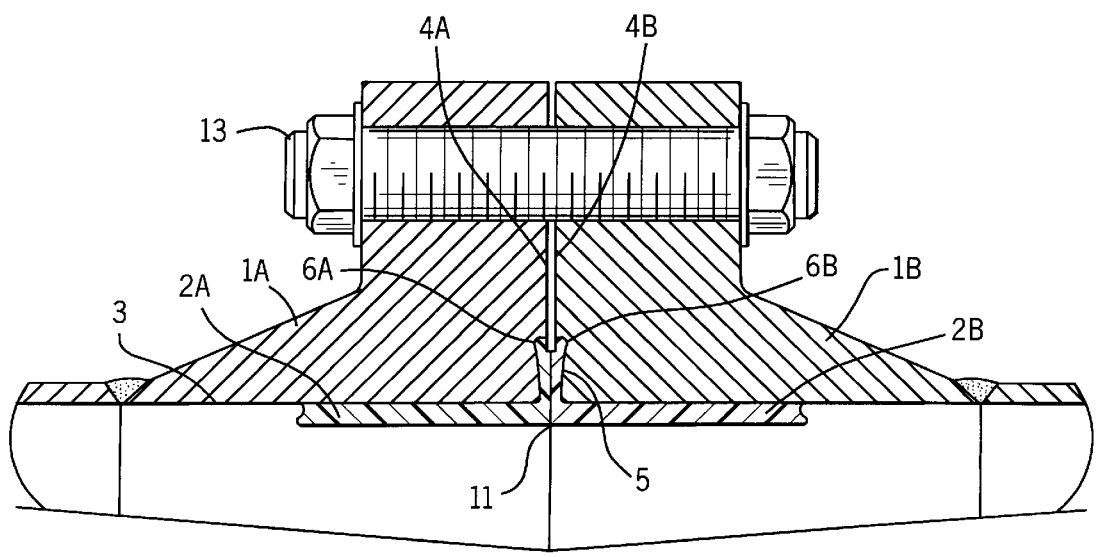
FIG. 4 is a section view of the pipe flange of FIG. 2 mated to an identical pipe flange using compressive force.

As shown in FIG. 4, pipe flange 1A is mated with an identical pipe flange 1B resulting in a pressure seal for this pipe flange connection. Linings 2A, 2B each protrude beyond faces 4A, 4B of flanges 1A, 1B such that when flanges 1A, 1B are compressed together a pressure sealing gasket surface is formed which effectively isolates the abrasive and/or corrosive materials within linings 2A, 2B. Compression of linings 2A, 2B results in extrusion of linings 2A, 2B into expansion cavities 6A, 6B. Joint 11 between flanges 1A, 1B is void of any inwardly bulging deformations after the compression of linings 2A, 2B. The lack of inward deformations at joint 11 helps to reduce the flow turbulence. High flow turbulence can lead to excessive wear and corrosion within the pipe flange connection.

Figure 5:
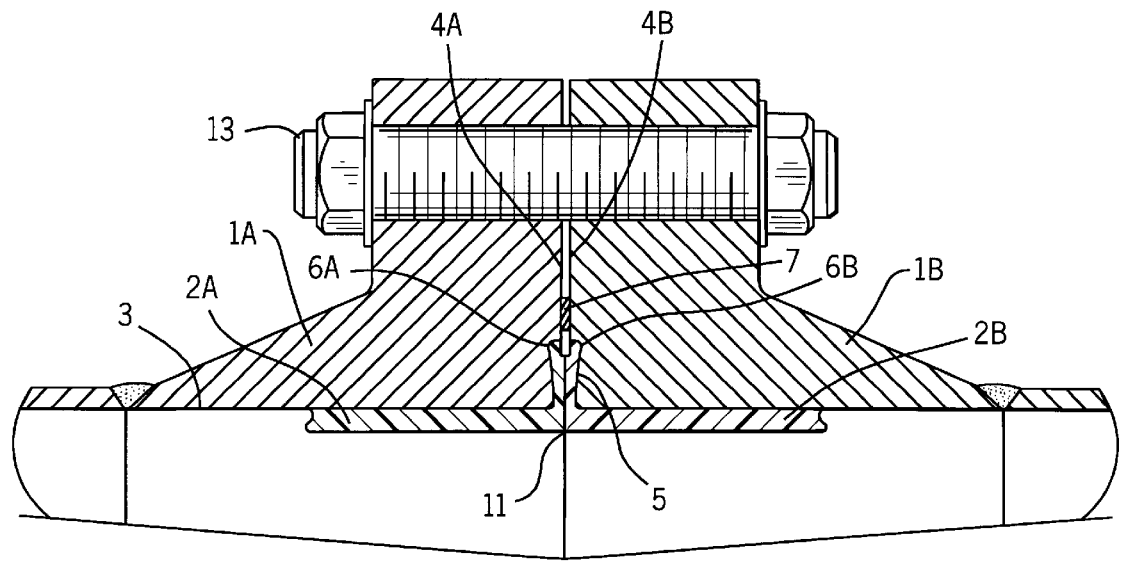
FIG. 5 is a section view of the pipe flange of FIG. 2 mated to an identical pipe flange using compressive force with a gasket located between the pipe flanges.

In another embodiment, as shown in FIG. 5, gasket 7 may be located outside expansion cavities 6A, 6B and against faces 4A, 4B of flanges 1A, 1B. Gasket 7 may be metallic or a fiber pressure retaining type. Gasket 7 can also serve as a compression limiter allowing for exact compression of elastomeric linings 2A, 2B as gauged by the mating space between flanges 1A, 1B.

Linings 2A, 2B in groove 5 provide a seal to isolate pipe flanges 1A, 1B from the abrasive and/or corrosive materials being transported as well as protecting the non-elastomeric gasket 7 from abrasion and/or corrosion.

Pipe flanges 1A, 1B may both contain a plurality of openings allowing flanges 1A, 1B to be mated together using fasteners 13 to apply a compressive force. As shown in FIG. 2, a typical embodiment has openings spaced uniformly about flanges 1A, 1B outside the area on face 4A of flange 1A where gasket 7 may be inserted. The uniformly spaced openings are commonly known as a bolt circle with the openings varying in size depending on the desired fastener to be used to apply the compressive force for mating flanges 1A, 1B together.

Figure 6:
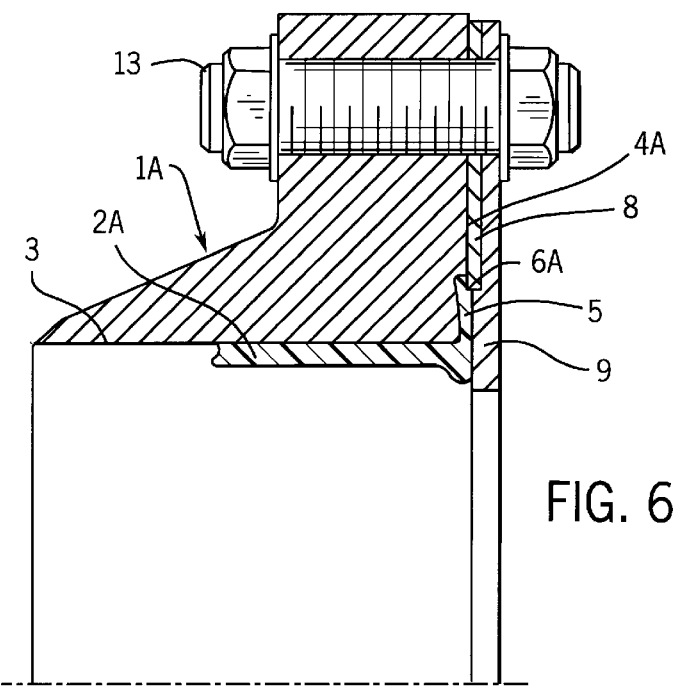
FIG. 6 is a section view illustrating the pipe flange of FIG. 2 with a two piece mold used to form a lining on the inside surface of the pipe flange.

The present invention also involves a method of applying an elastomeric lining to a pipe flange. As shown in FIG. 6, a two-piece mold is fixed to face 4A of pipe flange 1A. The mold comprises inner plate 8 and outer plate 9. Inner plate 8 ensures the formation of a consistent expansion cavity 6A between lining 2A and face 4A of flange 1A during molding. Outer plate 9 ensures the consistent protrusion of lining 2A beyond face 4A of flange 1A during molding. In addition, outer plate 9 can be customized to provide for any desired protrusion of lining 2A beyond face 4A. Changing the amount of protrusion of lining 2A beyond face 4A adjusts the amount of compressive force sustained during assembly of the pipe flange connection.

Figure 7:
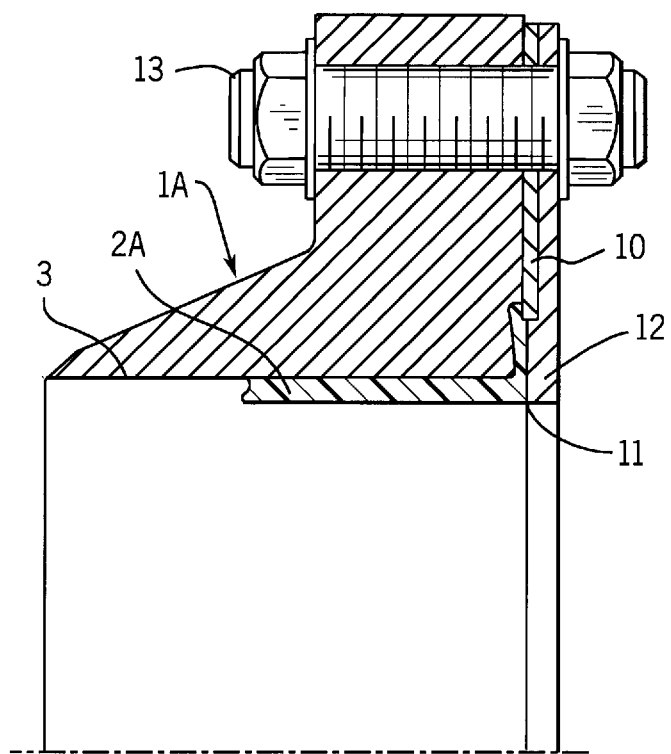
FIG. 7 is a section view of the pipe flange of FIG. 6 attached to a gasket template and a grinding template after the lining has been ground against the grinding template to remove any inwardly bulging deformations.

The method may further include removing the two-piece mold after lining 2A has cured. As shown in FIG. 7, gasket template 10 and grinding template 12 are mated to face 4A of pipe flange 1A using compressive force. The gasket template 10 and grinding template 12 simulate the affects of bolting another object, e.g. a tank or similar pipe flange, to pipe flange 1A as would be expected in a finished installation of pipe flange 1A. Any inwardly bulging deformations in the surface of lining 2A are removed by grinding lining 2A at joint 11 against grinding template 12 to secure a smooth profile. The profile of joint 11 after final finishing with grinding template 12 will be duplicated when pipe flange 1A is compressed against another object and installed in a pipe flange connection.

Although the present invention has been described in considerable detail with reference to certain preferred versions thereof, other versions are possible. The pipe flange connection may be with or without a gasket as well as mated to another object in a variety of configurations using compressive force. A variety of mold designs may also be employed in performing the method of applying an elastomeric lining.

We claim:

1. A pipe flange connection comprising:
   a. first pipe flange fitted with a lining along an inside surface, the pipe flange having a face with an annular groove both extending outward from the inside surface along at least a portion of the face and tapering Such that the groove deepens as the groove progresses outwardly from the inside surface of the pipe flange, the lining extending into the groove such that the lining at least partially fills the groove while protruding beyond the face of the flange, and
   b. a second pipe flange fitted with a lining along an inside surface, the pipe flange having a face with an annular groove both extending outward from the inside surface along at least a portion of the face and tapering such that the groove deepens as the groove progresses outwardly from the inside surface of the pipe flange, the lining extending into the groove such that the lining at least partially fills the groove while protruding beyond the face of the flange, the face of the first pipe flange mated against the face of the second pipe flange using compressive force such that a joint with a smooth profile is created between the lining of the first and second pipe flanges.

2. The pipe flange connection of claim 1 wherein the lining is an elastomer.

3. The pipe flange connection of claim 1 wherein the lining is plastic.

4. The pipe flange connection of claim 1 further comprising at least one fastener, wherein the face of the pipe flange has at least one opening for receiving at least one fastener such that the pipe flange can be mated to the object using the fastener to apply compressive force.

* * * * *